May 29, 1951 E. A. WEINBERG 2,555,262
PLUG VALVE
Filed May 8, 1945

INVENTOR.
Edwin A. Weinberg
BY
ATTORNEY

Patented May 29, 1951

2,555,262

UNITED STATES PATENT OFFICE 2,555,262

PLUG VALVE

Edwin A. Weinberg, Troy, N. Y., assignor to The Ludlow Valve Manufacturing Co., Inc., Troy, N. Y., a corporation of New York Application May 8, 1945, Serial No. 592,538

4 Claims. (Cl. 251—49)

My invention relates to plug valves and particularly but not exclusively to small size valves of this general type.

The size of the stem which can be used in a small size valve is quite limited and the effective cross section thereof is reduced in certain zones by threads, annular cuts, pin holes and the like which are necessary in order to secure the plug thereto. Thus, a strong man in closing the valve tightly, will frequently twist the stem off in some such zone of reduced cross sectional area.

Furthermore, in certain types of valves in which the plug is provided with a plurality of axially spaced, seat contacting surfaces providing spaces therebetween for the step by step expansion of fluids passing through said valve, the seat may be scored by rotation of the plug as it is forced into its seat in closing the valve. To overcome this difficulty, a swivel connection is sometimes provided between the stem and the plug so that substantially free relative rotative movement is provided between these members. However, since such a connection is inside the valve and exposed to the fluid passing therethrough, corrosion frequently prevents the proper functioning of the swivel so that the plug and stem turn together and scoring of the seat results. Moreover, in the smaller sizes of valves such a swivel connection reduces very substantially the cross section of the stem and, where the swivel connection fails to function properly, the stem sometimes shears off in the plug.

In order to prevent the stem from blowing out in the event that its connection with the valve plug should fail it is usually the practice to provide a shoulder on the valve stem at the bottom thereof. To form such a shoulder it is necessary either to upset the plug end of the valve stem or to turn down substantially the entire length of the stem. Either of these operations is expensive.

Furthermore, valves of this type as usually made having a one piece stem, when used for fluids which have a tendency to form crystals and creep upwardly through the stuffing box will, in a short time, foul the threaded portion of the stem and prevent satisfactory operation of the valve.

In addition, valves of this type as now made when used to control the flow of fluids at high temperature frequently leak due to the contraction of the stem on cooling which has a tendency to withdraw the plug from tight valve-closing contact with its seat.

One of the objects of my invention is to provide a valve in which that portion of the stem within the valve is not subjected to twisting stresses of any substantial magnitude in opening and closing the valve and in which the stresses developed are purely tension and compression. Another object is to provide a plug-stem assembly in which that portion of the stem which carries the plug and which is within the valve is freely rotatable with respect to that portion of the stem to which the hand wheel or other element used to open and close the valve is attached. Another object is to provide a swivel connection between separate sections of the valve stem which will be positioned exterior of the valve; which is of simple construction and easily assembled and disassembled. Another object is to provide an inexpensive and efficient construction whereby the blowing out of the valve stem due to failure of its connection with the plug, or to corrosion, is prevented. Another object is to provide a valve stem having a baffle forming means positioned between the valve stem threads and the stuffing box whereby to prevent the passage of fluids which may tend to creep up through the stuffing box and foul the threaded portions of the stem. A further object is to provide a simple and improved means of compensating for the contraction of the valve stem which occurs upon cooling of the valve and which tends to withdraw the plug from its seat thereby causing leakage.

With these objects in view my invention includes the novel elements and combinations and arrangements thereof described below and illustrated in the accompanying drawing in which.

Figures 1, 2, 3, 4:
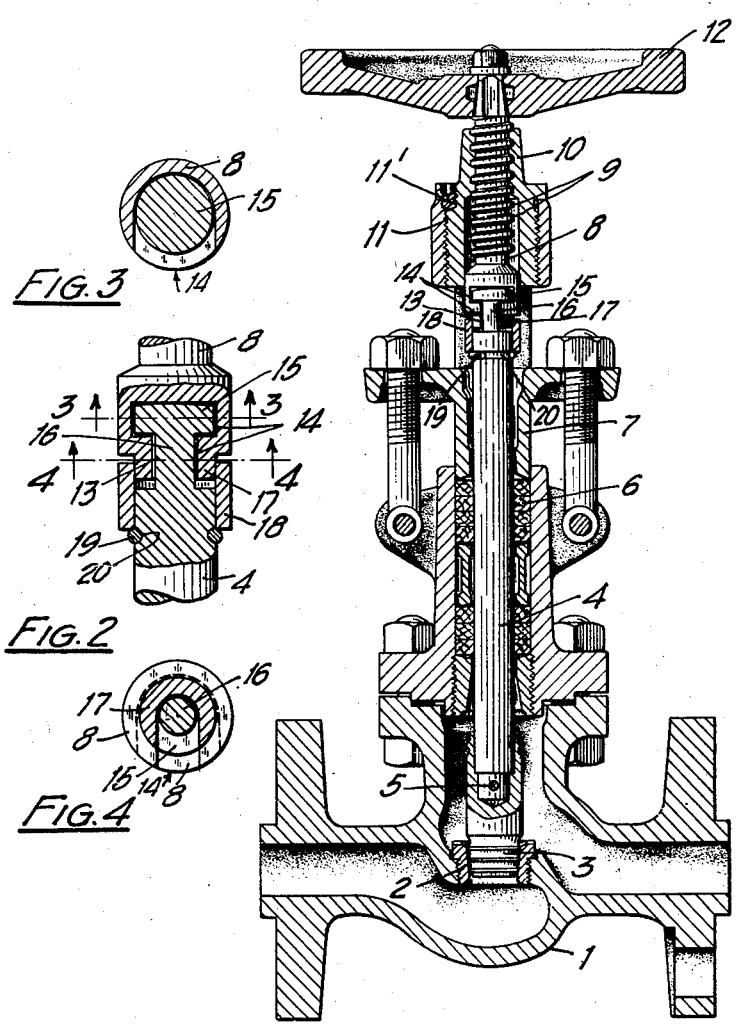
Fig. 1 is a cross section taken in the plane of the axis of the stem of the valve and the axis of the pipe to which the valve is adapted to be connected.
Fig. 2 is an enlarged section, partially in elevation, of the connection between the separate sections of the stem.
Fig. 3 is a section of Fig. 2 in the plane 3—3.
Fig. 4 is a section of Fig. 2 in the plane 4—4.

Referring to the drawings:

1 is the body of the valve having the seat 2 therein which cooperates with the plug 3 to close the valve. 4 is the lower section of the valve stem which is secured to the plug by means of a pin 5, or otherwise, and which extends through the usual packing 6 and gland 7 to a point above the gland. 8 is the other section of the stem which is provided with threads 9 on the exterior thereof cooperating with the threaded interior of the yoke nut 10 which, in turn, is threaded into the yoke, as shown at 11, and locked by the set screw 11'. The hand wheel 12, which is turned to open and close the valve, is secured to the section 8 of the stem.

The stem sections at their adjacent ends are provided with interfitting portions which provide substantially free, relative, rotative movements thereof but prevent separation of the sections under stress applied axially of the stem. Thus, section 4 is provided with an annular groove 13 adjacent its end, and the section 8 is provided with a recess 14 extending inwardly from the side thereof which is adapted to receive the end 15 of section 4 and also the reduced portion 16 adjacent thereto. The diameter of the section 8, at the extreme end thereof, as shown at 17, is reduced to the same diameter as the section 4, and the interfitting portions of the stem sections are held in assembled relation by the sleeve 18 which overlies the reduced portion 17 of stem 8 and the portion of stem 4 immediately below the annular groove 13. The sleeve 18 is held in place by the snap ring 19 which cooperates with an annular groove 20 in section 4. It will be apparent that, since the sections of the stem when assembled in the valve are held in axial alignment, the sleeve 18 and the snap ring 19 are not absolutely essential to prevent the sections of the stem from separating. When assembled in axial alignment in the valve they are inseparable. However, the sleeve 18 prevents the valve stem sections from buckling or misalignment when under compression, and also forms a baffle for preventing fluid creeping up the stem from getting into the swivel assembly or reaching the threads 9.

From the foregoing it will be apparent that the coupling between the stem sections is entirely outside the valve where it is not exposed to corrosive media passing through the valve, and where it is accessible for lubrication.

While the stem sections are normally held in axial alignment by means of the sleeve 18, they may be readily separated by first removing the hand wheel 12, and the yoke nut 10. Thereafter, the snap ring 19 may be removed and the sleeve 18 dropped down sufficiently to permit the section 8 to move laterally with respect to section 4 a sufficient distance to effect disengagement of the sections.

In my valve, a shoulder at the plug end of the valve stem to prevent the stem from blowing out is not necessary. The yoke nut 10 prevents the enlarged bottom of section 8 of the stem from passing therethrough, and, inasmuch as the section 4 of the stem cannot be withdrawn until the yoke nut is removed, it is not possible for the stem to blow out and create a hazard should the part of the stem inside the valve fail for any reason.

By forming the yoke nut of a material having a greater coefficient of expansion than the material in the valve stem it shrinks more upon cooling than does the stem, and thus urges the plug towards its seat and maintains it in tight contact therewith despite temperature changes.

It is to be understood that the valve shown in the drawings is merely illustrative of one type to which my invention may be applied; that the words which I have used in describing my invention are words of description rather than of limitation; and that changes within the purview of the appended claims may be made without departing from the true scope and spirit of my invention in its broader aspects.

What I claim is:

1. In a valve, an elongated valve stem comprising two coaxial sections, one of said sections terminating in a closure element and the other end thereof terminating in an annular groove; and the other section terminating in an enlarged head having a recess therein interfittingly receiving the annular groove of said other section interlockingly to maintain said stem sections in coaxial alignment, and said other section being provided with threads on the exterior thereof.

2. A valve comprising a body, a single closure element, and a seat for said element in said body, an elongated valve stem comprising two coaxial sections, one of said sections terminating in a closure element and the other end thereof terminating in an annular groove; and the other section terminating in an enlarged head having a recess therein interfittingly receiving the annular groove of said other section to maintain said stem sections in coaxial alignment, which head has a reduced extension of the same diameter as said first named section; and a sleeve overlying said reduced portion and said annular groove, and said other section being provided with threads on the exterior thereof; a nut fixedly secured exteriorly of said body and cooperating with the threads on said other section; said nut being formed of a material having a substantially higher coefficient of expansion than the material in said stem; whereby, when said valve is closed at high temperature, the contraction of said nut on cooling will exceed the contraction of said stem, and thus urge said closure element towards its seat.

3. In a valve, an elongated valve stem comprising two coaxial sections, one of said sections terminating in a closure element and the other end thereof terminating in an annular groove; and the other section terminating in an enlarged head having a recess therein interfittingly receiving the annular groove of said other section to maintain said stem sections in coaxial alignment, which head has a reduced extension of the same diameter as said first named section, and a sleeve overlying said reduced portion and said annular groove, to maintain said stem sections in coaxial alignment, and said other section being provided with threads on the exterior thereof.

4. A valve comprising a body, a single closure element only and a seat for said element in said body, a stem comprising two coaxial sections, one of said sections being secured to said closure element and the other of said sections being provided with threads on the exterior thereof, means, including a sleeve, exterior of said body connecting the sections of said stem to move together in either direction axially thereof but providing relative rotative movements of said sections, and a nut fixedly secured to said body and cooperating with the threads on said other section; a portion of said other stem section intermediate said threads and said connecting means being of larger diameter than said threads; whereby its passage through said nut is prevented, said portion of larger diameter being recessed, said first mentioned section, at the end opposite that secured to said closure element, having a portion interfittingly cooperating with said recess portion and preventing relative axial movement of said sections, and said sleeve cooperating with each of said sections to hold said portions in interfitted relation.

EDWIN A. WEINBERG.

REFERENCES CITED

The following references are of record in the file of this patent:

UNITED STATES PATENTS

| Number | Name | Date |
|---|---|---|
| 258,592 | O'Meara | May 30, 1882 |
| 941,351 | Smith | Nov. 23, 1909 |
| 1,484,727 | Love | Feb. 26, 1924 |
| 1,523,953 | Giesler | Jan. 20, 1925 |
| 1,541,757 | Allen | June 9, 1925 |
| 2,118,858 | Newhall | May 31, 1938 |
| 2,181,059 | Lee | Nov. 21, 1939 |